(12) United States Patent
Franks et al.

(10) Patent No.: US 6,576,083 B2
(45) Date of Patent: Jun. 10, 2003

(54) DEINKING OF WASTE PAPER

(75) Inventors: Neal Franks, Raleigh, NC (US); Kelly Page, Bailey, NC (US)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 09/826,691

(22) Filed: Apr. 5, 2001

(65) Prior Publication Data

US 2002/0179261 A1 Dec. 5, 2002

(51) Int. Cl.⁷ .......................... D21H 11/20; D21H 25/02
(52) U.S. Cl. .............................. 162/5; 162/72; 435/278
(58) Field of Search ........................ 162/5, 72; 435/278

(56) References Cited

U.S. PATENT DOCUMENTS

| | | | |
|---|---|---|---|
| 5,525,193 A | 6/1996 | Franks et al. ................. 162/5 |
| 5,785,809 A | 7/1998 | Ow et al. ...................... 162/5 |
| 5,879,509 A | * 3/1999 | Sharyo et al. ................. 162/5 |
| 5,972,872 A | * 10/1999 | Lange et al. ................. 510/392 |
| 6,124,127 A | * 9/2000 | Andersen et al. ........... 435/232 |

OTHER PUBLICATIONS

Mokuzai Gakkaishi vol. 30, No. 10, p. 848–856, "Effects of Alkaline Pre–Soaking in Controlled Enzymatic Pulping on Pulp and Paper Properties of Kozp Pulp", Kobayashi et al.

* cited by examiner

*Primary Examiner*—Dean T. Nguyen
(74) *Attorney, Agent, or Firm*—Elias Lambiris; Jason Garbell

(57) ABSTRACT

In the production of pulp and paper from starch-containing paper, the deinking effect can be improved by including treatment with both a starch-degrading enzyme and a pectate lyase. The process comprises enzyme treatment during or after disintegration of the paper to produce pulp, followed by separation of ink particles.

19 Claims, No Drawings

DEINKING OF WASTE PAPER

TECHNICAL FIELD

This invention relates to processes for removing inks, coatings and toners during the recycling of starch-containing waste papers using both a starch-degrading enzyme and a pectate lyase. More particularly, it relates to such processes leading to improved brightness and cleanliness of the pulp or paper.

BACKGROUND ART

In the recycling of waste paper it is usually desirable to remove the printing ink in order to produce new paper of high brightness and improved cleanliness. The term "cleanliness" relates to a lack of or a reduced amount of residual ink particles in the pulp and/or paper produced from these pulps. Some of the higher quality grades of paper including mixed office waste have seen a lower rate of reuse compare to other grades, such as old corrugated cardboard. This is due to the difficulty of removing polymeric inks, coatings and toners such as non-contact, fused laser-prints, xerographic toners, UV/EB cured inks, varnish overlays and coated paper. It is conventional to repulp (or disintegrate) the old paper together with deinking chemicals, such as deinking surfactant, NaOH and sodium silicate, combined with bleaching/brightening with hydrogen peroxide and deinking chemicals and by separation of ink particles from the pulp. However, standard chemical deinking agents may not work well for laser ink and xerographic toner removal.

Enzymatic methods have been described in the prior art to improve removal of ink and thereby increase the brightness and the cleanliness of the pulp produced from this process.

An amylase, i.e. a starch-degrading enzyme has been described in U.S. Pat. No. 5,879,509 (Novo Nordisk) to improve the deinking effect. Pectinases are disclosed in U.S. Pat. No. 5,785,809 (KRICT) to dislodge ink particles from waste paper. Furthermore, the use of endo-pectate lyase in the pulping of kôzo (Japanese paper mulberry, *Broussonetia kazinoki* Sieb) has been described by Kobayashi Y et al. (1984), Mokuzai Gakkaishi, 30, 848-56.

It is the object of this invention to provide an improved process for removal of printing ink and increasing brightness and cleanliness of the pulp and paper for use in the recycling of starch-containing waste paper.

STATEMENT OF THE INVENTION

We have found that in the production of pulp and paper from starch-containing printed paper, the deinking effect can be improved by including treatment with both a starch-degrading enzyme and a pectate lyase.

Accordingly, the invention provides a process for producing a papermaking pulp from starch-containing printed paper, comprising the following steps:
 a) disintegrating the paper to produce a pulp,
 b) treating with a starch-degrading enzyme and an pectate lyase during or after step a), and
 c) separating ink particles from the pulp after steps a) and b).

The invention also provides a process for recycling old starch-containing printed paper into new paper or tissue, comprising producing a pulp by the above process, followed by paper- or tissue-making.

DETAILED DESCRIPTION OF THE INVENTION

In the context of the present invention the term "improved deinking effect" and "improved process," indicates that the brightness and cleanliness of any paper produced from the deinked pulp is increased/enhanced in comparison to paper produced from pulps which have not been treated according to the present invention.

Starch-Containing Printed Paper

The process of the invention is applicable to the recycling of any kind of printed, starch-containing paper. Examples include old newspaper, magazines, mixed and sorted office waste and papers printed using laser or Xerographic methods. The paper may contain mineral fillers such as calcium carbonate and clay.

The starch used in the manufacture of these papers may consist of starch from any source and generally contains 20–30% of amylose and the balance amylopectin. Examples include corn starch, wheat starch, potato starch, rice starch and tapioca starch. When used as a coating or sizing material, the starch to be used will generally be pretreated to achieve a limited hydrolysis by cooking with amylase or acid.

The starches used in the paper manufacturing process may also consist of modified starch. Modified starches useful for paper coating include dextrin (e.g. white dextrin, canary dextrin or British gum), acid-modified starch, oxidized starch (chlorinated starch), hydroxyethylated starch and cationic starch.

The inks to be removed by the process of this invention include but are not limited to non-contact laser inks, xerographic toners, letterpress ink generally used in printing newsprint, magazine print, offset printing ink, ultraviolet or electron beam cured ink.

Disintegration

The disintegration step may be performed in a conventional pulper, typically for 5–30 minutes at 3–30% pulp consistency.

Conventional deinking chemicals typically comprise an alkaline reagent and a surfactant. The surfactant can, e.g., be used at a dosage of 0.025–0.6%, preferably 0.030–0.15%. The surfactant is preferably nonionic in nature, e.g. ethoxylated octyl or nonyl phenol or any of the nonionic surfactants disclosed in Park et al., 1992, Biotechnology and Bioengineering 39:117–120. The alkaline reagent may be NaOH (e.g. 0.2–5%, preferably 0.5–1%) and/or sodium silicate (e.g. 0.4–5%, preferably 0.5–2%). The alkaline reagents are usually added to a pH of 8–12, preferably 10–11.5. The deinking chemicals may further comprise magnesium sulfate, and hydrogen peroxide.

If the enzyme treatment is performed during or after the disintegration, it may be preferable to modify the addition of deinking chemicals (as described further below) in order to provide suitable conditions for the action of the enzyme, and particularly to reduce or avoid the addition of alkaline reagent to achieve a pH, which is suitable for the enzyme action.

Starch-Degrading Enzyme

The starch-degrading or amylolytic enzyme is preferably an amylase, e.g. an α-amylase, a glucoamylase or a debranching enzyme. A single enzyme or a combination may be used, e.g. α-amylase together with glucoamylase and/or a debranching enzyme. It is preferred to perform the enzyme treatment at an alkaline pH in the range 6–10, preferably 8–10 and to use an enzyme, which is alkaline stable and active in this range and preferably has optimum activity in this range.

Examples of preferred α-amylases are those derived from strains of Bacillus, e.g. *B. amyloliquefaciens* (*B. subtilis*), *B. licheniformis* or *B. stearothermophilus* and from strains of Aspergillus, e.g. *A. oryzae*. Examples of commercial products are BAN™, Termamyl®, Aquazyme Ultra™ and Fungamyl™ (products of Novozymes A/S).

Glucoamylase derived from a strain of *Aspergillus niger* is preferred, e.g. the commercial product AMG (product of Novozymes A/S).

The debranching enzyme is preferably a pullulanase, particularly one derived from a strain of *Bacillus acidopullulyticus*, e.g. the commercial product Promozyme® (product of Novozymes A/S).

Suitable conditions for Bacillus amylase may be pH 4–10, 20°–90° C., preferably pH 6–10, 40°–70° C. Suitable conditions for *A. oryzae* amylase may be pH 3–8, 20°–70° C., preferably pH 5–6.

Pectate Lyase

The Pectate lyase (EC 4.2.2.2) is an enzyme which catalyse the random cleavage of α-1,4-glycosidic linkages in pectic acid (also called polygalacturonic acid) by transelimination. Pectate lyases also include polygalacturonate lyases and poly(1,4-α-D-galacturonide) lyases. A single enzyme or a combination of pectate lyases may be used.

It is preferred to perform the enzyme treatment at a pH of 6–10, more preferably pH 8–10 and a temperature of 25–80° C., is more preferably 35–55° C. The use of precipitated calcium carbonate in some types of papers mentioned above assures an adequate calcium ion level for the action of certain of the amylases also mentioned earlier.

Examples of preferred pectate lyases are those that have been cloned from different bacterial genera such as Erwinia, Pseudomonas, Klebsiella, Xanthomonas and Bacillus, especially *Bacillus licheniformis* (U.S. patent application No. 6,124,127), as well as from *Bacillus subtilis* (Nasser et al. (1993) *FEBS Letts.* 335:319–326) and *Bacillus* sp. YA-14 (Kim et al. (1994)*Biosci. Biotech. Biochem.* 58:947–949). Purification of pectate lyases with maximum activity in the pH range of 8–10 produced by *Bacillus pumilus* (Dave and Vaughn (1971) *J. Bacteriol.* 108:166–174), *B. polymyxa* (Nagel and Vaughn (1961) *Arch. Biochem. Biophys.* 93:344–352), *B. stearothermophilus* (Karbassi and Vaughn (1980) *Can. J. Microbiol.* 26:377–384), *Bacillus* sp. (Hasegawa and Nagel (1966) *J. Food Sci.* 31:838–845) and *Bacillus* sp. RK9 (Kelly and Fogarty (1978) *Can. J. Microbiol.* 24:1164–1172) have also been described. Any of the above, as well as divalent cation-independent and/or thermostable pectate lyases, may be used in practicing the invention.

A preferred pectate lyase may be obtained from *Bacillus licheniformis* as described in U.S. patent application No. 6,124,127.

Other pectate lyases could be those that comprise the amino acid sequence of a pectate lyase disclosed in Heffron et al., (1995) *Mol. Plant-Microbe Interact.* 8: 331–334 and Henrissat et al., (1995) *Plant Physiol.* 107: 963–976.

It will be understood that any polypeptide exhibiting pectate lyase activity may be used in practicing the invention. That is, pectate lyases derived from other organisms, or pectate lyases derived from the enzymes listed above in which one or more amino acids have been added, deleted, or substituted, including hybrid polypeptides, may be used, so long as the resulting polypeptides exhibit pectate lyase activity. Pectate lyases for use in the invention may be derived from their cell of origin or may be recombinantly produced, and may be purified or isolated. As used herein, "purified" or "isolated" pectate lyase is pectate lyase that has been treated to remove non-pectate lyase material derived from the cell in which it was synthesized that could interfere with its enzymatic activity. Typically, the pectate lyase is separated from the bacterial or fungal microorganism in which it is produced as an endogenous constituent or as a recombinant product. If the pectate lyase is secreted into the culture medium, purification may comprise separating the culture medium from the biomass by centrifugation, filtration, or precipitation, using conventional methods. Alternatively, the pectate lyase may be released from the host cell by cell disruption and separation of the biomass. In some cases, further purification may be achieved by conventional protein purification methods, including without limitation ammonium sulfate precipitation; acid or chaotrope extraction; ion-exchange, molecular sieve, and hydrophobic chromatography, including FPLC and HPLC; preparative isoelectric focusing; and preparative polyacrylamide gel electrophoresis. Alternatively, purification may be achieved using affinity chromatography, including immunoaffinity chromatography. For example, hybrid recombinant pectate lyases may be used having an additional amino acid sequence that serves as an affinity "tag", which facilitates purification using an appropriate solid-phase matrix.

The pectate lyases used in the methods of the invention may be chemically modified to enhance one or more properties that render them even more advantageous, such as, e.g., increasing solubility, decreasing lability or divalent ion dependence, etc. The modifications include, without limitation, phosphorylation, acetylation, sulfation, acylation, or other protein modifications known to those skilled in the art.

Enzyme Treatment

Normally, the enzyme treatment will consist of a simultaneously treatment with a starch-degrading enzyme and a pectate lyase during or after disintegration, but it may consist of treatment with a starch-degrading enzyme first and a pectate lyase later during or after disintegration or vice versa.

In the following the term enzyme treatment refers to simultaneous treatment with a starch-degrading enzyme and a pectate lyase, treatment with a starch-degrading enzyme first followed by treatment with a pectate lyase later or vice versa.

The process conditions are selected so as to increase the brightness and cleanliness of the pulp after the deinking and the brightness and cleanliness of the paper produced from this pulp. Preferred process conditions are at pH 6–10, more preferably pH 8–10, most preferably pH 8–9 and a temperature at 25–80° C., more preferably 35–55° C. A preferred reaction time may be found in the range 10 min–24 hours, particularly 10 min–3 hours at an amylase dosage of 0.01–10 KNU/g dry matter (1 KNU=1000 NU, which is described below), preferably 0.02–3) KNU/g of dry matter and a pectate lyase dosage of 0.01–10 APSU/g of dry matter, preferably 0.05–5 APSU/g of dry matter.

Disintegration and Enzyme Treatment

Preferably, the enzyme treatment may be performed simultaneously with disintegration. In this case the enzyme treatment may optionally be continued by holding the pulp after the disintegration.

The enzyme treatment is preferably performed in the presence of a surfactant, and in the case of an α-amylase from Bacillus and a pectate lyase from Bacillus it is preferred to add alkaline reagents (typically NaOH or sodium carbonate) to achieve a suitable pH, e.g. pH 6–10 (preferably 8–10).

The disintegration and enzyme treatment will occur before the ink separation, which can be followed by conventional bleaching with hydrogen peroxide and deinking chemicals. Preferably, separation of ink particles is performed both before and after the bleaching.

The enzyme treatment may also be performed by addition of enzyme to the pulp after disintegration. In a preferred embodiment, this is performed simultaneously with hydrogen peroxide bleaching, preferably in the presence of a surfactant. In the case of simultaneous bleaching and treatment with an α-amylase from Bacillus and a pectate lyase from Bacillus it is preferred to add 0.5–2% $H_2O_2$ and alkaline reagents (typically NaOH and sodium silicate, e.g. 1–5% sodium silicate and 0.5–5% NaOH) so as to achieve pH 9–10. The combined bleaching and enzyme treatment is preferably performed at 30°–60° C. for 1–3 hours.

Separation of Ink Particles

After the disintegration and enzyme treatment, ink particles may be separated from the pulp in a conventional manner, such as by mechanical deinking, flotation, chemimechanical deinking, agglomeration chemistry (see e.g. McBride, Pulp and Paper, April 1994, Miller Freeman Publishers, San Francisco, p. 44), washing, cycles of dilution and filtration, treatment in hydrolcyclones, or by a suitable combination of these.

Papermaking

After deinking according to the invention, the deinked pulp is generally mixed with other pulp, e.g. kraft pulp and mechanical pulp etc., before papermaking. The final paper- or tissue-making step can be performed in a conventional paper- or tissue-making machine.

MATERIALS AND METHODS

Enzyme Activity

KNU:

The enzymatic activity measure used herein KNU (KNU= 1000 NU) is defined as the amount of enzyme which, under standard conditions (i.e. at 37° C.+/−0.05; 0.0003 M $Ca^{2+}$; and pH 5.6) dextrinizes 5.26 g starch dry substance Merck Amylum solubile.

The enzymatic activity may be determined using potato starch as substrate. This method is based on the break-down of modified potato starch by the enzyme, and the reaction is followed by mixing samples of the starch/enzyme solution with an iodine solution. Initially, a blackish-blue color is formed, but during the break-down of the starch the blue color gets weaker and gradually turns into a reddish-brown, which is compared to a colored glass standard.

APSU:

The APSU unit assay is a viscosity measurement using substrate polygalacturonic acid with no added calcium. The substrate 5% w/v polygalacturonate acid sodium salt (Sigma P-1879) is solubilised in 0.1 M Glycin buffer pH 10. The 4 ml substrate is preincubated for 5 min at 40° C. The enzyme is added (in a volume of 250 μl) and mixed for 10 s on a mixer at maximum speed, it is then incubated for 20 min at 40° C. For a standard curve double determination of a dilution of enzyme concentration in the range of 5 APSU/to above 100 APSU/ml with minimum of 4 concentrations between 10 and 60 APSU/ml. The viscosity is measured using a MIVI 600 from the company Sofraser, 45700 Villemandeur, France. The viscosity is measured as mV after 10 s. For calculation of APSU units an enzyme standard dilution as described above was used for obtaining a standard curve. The GrafPad Prism program, using a non linear fit with a one phase exponential decay with a plateau, was used for calculations. The plateau plus span is the mV obtained without enzyme. The plateau is the mV of more than 100 APSU and the half reduction of viscosity in both examples was found to be 12 APSU units with a standard error of 1.5 APSU.

Enzymes

| Starch-degrading enzyme: | Aquazym 240 L; 240 KNU/g |
|---|---|
| Pectate lyase: | Obtained from B. licheniformis as described in U.S. Pat. No. 6,124,127; 3000 APSU/g. |

Surfactant

Rexonic 1218-6 from Huntsman

Equipment

Hobart mixer with 4 l vessel and spade mixer.
Lamort floatation deinking cell, 17 l
Canadian Standard Freeness Tester.
TAPPI Handsheet mold.
TAPPI handsheet press.
(In both of the above terms, the use of TAPPI is the accepted abbreviation for the Technical Association of the Pulp and Paper Industry, Atlanta, Ga. TAPPI maintains a series of standard methods, which are published and entitled "TAPPI Standard Methods". They are available from TAPPI Press, Atlanta, Ga.

In the methods below which cite a TAPPI Standard Method, reference is automatically made to that method as published as part of these standard methods.)

MacBeth Color-Eye 7000 Spectrophotometer.
Scanner based image analysis system using Optimas software and macro developed by Physimetrics, Inc, Roswell, Ga.

Analysis

% Brightness was evaluated on the MacBeth Color-Eye 7000 Spectrophotometer using TAPPI handsheets made from the pulp in question. In these cases, the wire side of the handsheet was measured while being backed by the other handsheets made from the same pulp.

Residual ink concentration was evaluated with image analysis by scanning the handsheets wet.

EXAMPLE 1

Enzyme Treatment of Mixed Office Waste

The waste paper used in process of the invention was mixed office waste (MOW) collected from recycled office paper bin.

Repulping 140 g of the preprinted, shredded waste paper was added to 700 ml, 55° C. water in Hobart (water bath at 62.3° C.). The paper was agitated at lowest speed (1) until it was wet. An additional 270 ml of 55° C. water was added to Hobart. The pulp was mixed well. The temperature and pH was recorded. 50 ml of either water or buffer solution containing the desired amount of enzyme was added to 50 ml of deionised water containing 0.05 g surfactant (Rexonic 1218-6, Huntsman) before the whole solution was added to Hobart. The enzyme solution consisted of a) 0.4 kg/ton of air-dry paper starch-degrading enzyme or b) a combination of 0.4 kg/ton of air-dry paper starch-degrading enzyme and 0.1 kg/ton of air-dry paper of pectate lyase. The mixer was run at low speed for 20 min. The final temperature and pH was recorded.

A bucket was filled with 3 l of 55° C. water and the pulp was moved from Hobart to the bucket. The diluted pulp was stirred in the bucket for 2 min with an external stirrer.

Flotation 8 l of hot water was added to the deinking cell before the pulp was added to the cell. More water was added to the cell and the motor was turned on. The cell was filled to the top until it just began to overflow. The motor speed was adjusted to 1050–1100 rpm. The flotation process was continued for 10 min while skimming foam off top. The pulp was removed from the cell by draining into a bucket. Rejected ink was vacuum filtered on a tared filter paper using a Buchner funnel.

Formation of Handsheets

After flotation, paper sheets, which weighed between 1.14 g and 1.26 g were made from the pulp. The handsheet making procedure generally followed the method spelled out as TAPPI Method T 205 sp-95 (See above discussion relating to TAPPI methods). Five mL Lionsurf 66 was added to the graduated cylinder (25 mg Lionsurf 66/L pulp). The pulp was added to the Handsheet Mold (HSM) and it was filled with water to the line. The perforated stirrer was inserted and moved up and down 6 times in about 6±1 s. The stirrer was withdrawn at the top of the $6^{th}$ stroke. The drain was opened after a pause of 5 s. A blotter pad was placed on the handsheet and covered with couch plate. A couch roll was placed in the centre of the couch plate and rolled backwards and forwards five times in 10±2 s without applying any pressure downwards. The couch roll and plate was removed before the blotter pad was carefully removed carrying the handsheet along. The blotter pad was placed on a dry blotter on the TAPPI press with the handsheet up. The handsheets were stacked with a polished plate between each. The press was closed and the pressure raised to 50 psig in 30 s and then maintained for another 5 min. The handsheets were removed from the press and a dry blotter was placed on each handsheet. Again the press was closed and a pressure of 50 psig was maintained for 2 min. The plates with the handsheets were removed and each one was placed on a drying ring with the handsheets faced up. The handsheets were covered with a piece of filter paper and another ring was snapped into place. All plates with handsheets were stacked and a weight was placed at the top. The handsheets were left to dry overnight.

The brightness of the paper sheets was measured in a spectrophotometer and the residual dirt count was determined with image analysis by scanning the sheets wet as described above.

Control sheets were made by the same procedure without adding enzyme. Similarly, sheets were prepared where the enzyme treatment was replaced by caustic treatment (0.7% NaOH).

Results

| Treatment | Brightness (%) | Residual Ink concentration (ppm) | Average dirt size (mm$^2$) |
| --- | --- | --- | --- |
| None - Control | 85.6 | 8569 | 0.059 |
| 0.7% NaOH | 79.5 | 16789 | 0.044 |
| a) Starch-degrading enzyme | 85.5 | 9005 | 0.045 |
| b) Starch-degrading enzyme + Pectate lyase | 91.4 | 5514 | 0.029 |

The present data show that treating with both a starch-degrading enzyme and a pectate lyase during repulping of mixed office waste (MOW) increase brightness, decrease residual ink concentrations and decrease the average size of dirt particles compared to a treatment without enzymes, a conventional treatment (NaOH) or a treatment with only a starch-degrading enzyme.

What is claimed is:

1. A process for producing a papermaking pulp from starch-containing printed paper, comprising:

a) disintegrating the paper to produce a pulp, b) treating with an alpha-amylase and a pectate lyase during or after step a), and c) separating ink particles from the pulp after steps a) and b).

2. The process according to claim 1 wherein the alpha-amylase is an alkaline stable enzyme.

3. The process according to claim 1 wherein the alpha-amylase is derived from a strain of Bacillus.

4. The process according to claim 3 wherein the alpha-amylase is derived from B. amyloliquefaciens, B. licheniformis or B. stearothermophilus.

5. The process according to claim 1 wherein the enzymatic treatment is performed with an amount of starch-degrading enzyme in the range 0.01–10 KNU/g of dry matter.

6. The process according to claim 5 wherein the enzymatic treatment is performed with an amount of pectate lyase in the range 0.01–10 APSU/g of dry matter.

7. The process according to claim 1 wherein the pectate lyase is derived from or produced by a strain of Bacillus.

8. The process according to claim 7 wherein the pectate lyase is derived from or produced by B. licheniformis.

9. The process according to claim 1 wherein the enzymatic treatment is performed at a pH in the range 6–10.

10. The process according to claim 9 wherein the enzymatic treatment is performed at a pH in the range 8–10.

11. The process according to claim 1 wherein the starch-containing paper is mixed office waste.

12. The process of claim 1 wherein the enzyme treatment is performed simultaneously with the disintegration.

13. The process according to claim 12 wherein the enzyme treatment and disintegration are performed in the presence of a surfactant.

14. The process according to claim 12 wherein the enzyme treatment is continued after the disintegration.

15. The process according to claim 12 wherein said c) comprises the following sequential steps after the disintegration and the enzyme treatment:

separation of ink particles, bleaching, and separation of ink particles.

16. The process according to claim 1 wherein the enzyme treatment is performed after the disintegration.

17. The process according to claim 1 wherein the enzyme treatment is performed simultaneously with bleaching.

18. The process according to claim 17 wherein the enzyme treatment and bleaching are performed in the presence of hydrogen peroxide and a surfactant.

19. A process for making new paper or tissue from starch-containing printed paper, comprising producing papermaking pulp by the process of claim 1, and making new paper or tissue from the pulp.

* * * * *